(12) United States Patent
Kleiner et al.

(10) Patent No.: US 6,302,615 B1
(45) Date of Patent: Oct. 16, 2001

(54) BALL-AND-SOCKET JOINT

(75) Inventors: Wolfgang Kleiner, Wagenfeld; Klaus Bröker, Wallenhorst, both of (DE)

(73) Assignee: ZF Lemforder Metallwaren AG (DE)

( * ) Notice: Subject to any disclaimer, the term of this patent is extended or adjusted under 35 U.S.C. 154(b) by 0 days.

(21) Appl. No.: 09/209,158

(22) Filed: Dec. 10, 1998

(30) Foreign Application Priority Data

Dec. 19, 1997 (DE) .............................. 197 56 756

(51) Int. Cl.⁷ ...................................... F16C 11/00
(52) U.S. Cl. ..................... 403/135; 403/143; 403/133
(58) Field of Search .................. 403/135, 138, 403/132, 133, 134, 143, 144

(56) References Cited

U.S. PATENT DOCUMENTS

| | | | |
|---|---|---|---|
| 3,411,815 | * 11/1968 | Sullivan, Jr. ........................ | 403/138 |
| 3,602,560 | * 8/1971 | Memmel .............................. | 43/140 X |
| 3,650,004 | * 3/1972 | Bergstrom ........................... | 29/401 X |
| 3,753,584 | * 8/1973 | Kindel et al. ........................ | 403/133 |
| 3,787,129 | * 1/1974 | Kohler et al. ........................ | 403/135 |
| 3,969,030 | * 7/1976 | Sullivan .............................. | 403/133 |
| 3,999,870 | * 12/1976 | Clark et al. ........................ | 403/132 X |
| 4,235,558 | * 11/1980 | Snyder et al. ..................... | 403/133 X |
| 4,555,198 | * 11/1985 | Wenning et al. ................... | 403/133 X |
| 4,615,638 | * 10/1986 | Ito ..................................... | 403/133 X |
| 4,749,299 | * 6/1988 | Swanson ............................. | 403/132 |
| 4,750,885 | * 6/1988 | Ito ..................................... | 403/133 X |
| 4,790,682 | * 12/1988 | Henkel .............................. | 403/135 X |
| 5,067,841 | * 11/1991 | Fukuawa et al. .................. | 403/135 X |
| 5,163,769 | * 11/1992 | Dresselhouse ..................... | 403/135 X |
| 5,641,235 | * 6/1997 | Maughan et al. .................. | 403/133 |
| 5,795,092 | * 8/1998 | Jaworski et al. ................... | 403/135 X |
| 5,855,448 | * 1/1999 | Showalter et al. ................. | 403/134 |
| 5,904,436 | * 5/1999 | Maughan et al. .................. | 403/135 X |
| 6,019,541 | * 2/2000 | Maughan ............................ | 43/135 X |

* cited by examiner

Primary Examiner—Lynne H. Browne
Assistant Examiner—John R. Cottingham
(74) Attorney, Agent, or Firm—McGlew and Tuttle, P.C.

(57) ABSTRACT

A ball-and-socket joint preferably for vehicle suspensions or steerings of motor vehicles with a joint housing, with a housing cover closing the joint housing on one side, and with a pivot pin, which is mounted rotatably and deflectably in at least one bearing shell using a spherical bearing surface, is described. The bearing shell is in turn stationarily fixed in the joint housing and an elastic buffer element (6) is arranged on the outside of the joint housing (3) facing away from the pivot pin (1).

24 Claims, 5 Drawing Sheets

BALL-AND-SOCKET JOINT

FIELD OF THE INVENTION

The present invention pertains to a ball-and-socket joint preferably for vehicle suspensions or steering mechanisms of motor vehicles with a joint housing, with a housing cover closing the housing on one side, with a pivot pin, which is mounted rotatably and deflectably in at least one bearing shell by means of a spherical bearing surface, wherein the bearing shell is in turn fixed in the joint housing.

BACKGROUND OF THE INVENTION

Ball-and-socket joints of this type have been known, in principle, from the state of the art and have been used, e.g., as tie rod joints in motor vehicle steering arrangements. In addition, they are also used in many areas of vehicle engineering. Corresponding to their design, they are used such that they can absorb mainly forces in the radial load direction. This type of installation is due to the fact that such balland-socket joints of this type are sensitive to axial load, especially pulse-like axial impact load. Such an axial impact load may lead to damage to the spherical bearing surface with high consequential moments of friction within the ball-and-socket joint. Such damaged joints compromise the driving behavior and the driving safety of the vehicles affected.

High pulse-like loads may have different causes. They occur mainly as a consequence of incorrect mounting within the framework of service activities, in which the ball-and-socket joints are brought into desired positions by, e.g., blows with a hammer. Moreover, pulsed loads in the axial direction may occur under crowded space conditions due to the joint housing striking adjacent chassis parts, e.g., in the case of full spring deflection. The damaged joints resulting from the axial stresses make replacement necessary and therefore they ultimately cause increased maintenance costs for the vehicle in question.

SUMMARY AND OBJECTS OF THE INVENTION

The primary object of the present invention is to improve a ball-and-socket joint of the type mentioned such that besides the stresses occurring in the principal radial load direction, extraordinary pulse-like axial stresses will not lead to damage to the ball-and-socket joint such that adverse consequences are avoided. The mounting of such ball-and-socket joints, accepting high axial loads without the development of consequential damage, would, moreover, lead to simplified handling especially during service activities in connection with the maintenance of the vehicle.

According to the invention, a ball-and-socket joint preferably for vehicle suspensions or steering mechanisms of motor vehicles is provided including a joint housing, with a housing cover closing the joint housing on one side, and with a pivot pin, which is mounted rotatably and deflectably in at least one bearing shell by means of a spherical bearing surface, wherein the bearing shell is in turn stationarily fixed in the joint housing. An elastic buffer element is arranged on the outside of the joint housing facing away from the pivot pin and/or an elastic deformation zone is arranged at the bearing shell in the end area of the bearing surface of the pivot pin.

A combination of the technical features of an elastic buffer element arranged on the outside of the joint housing facing away from the pivot pin and an elastic deformation zone arranged at the bearing shell in the end area of the bearing surface of the pivot pin offers protection against resulting damage to the ball-and-socket joint according to the present invention especially when very high axial loads occur.

Both the elastic buffer element and the deformation zone arranged inside the ball-and-socket joint are able according to the present invention to absorb all axial loads occurring if the size is selected properly without the sensitive bearing shell being affected. As a result, final mounting in the vehicle without damage is possible by fitting the ball-and-socket joint by means of impact pulses, which substantially facilitates handling during service. In addition, the ball-and-socket joints according to the present invention can assume a stop function due to their special shaping within the framework of the functional integration, as a result of which both a weight reduction and a cost reduction are achieved because of the smaller number of components. The weight reduction is especially advantageous from the viewpoint that the use of the present invention reduces the weight of the unsprung masses on the chassis of a motor vehicle.

It has proved to be particularly advantageous for the elastic buffer element to have an essentially hemispherical outer contour at its free end facing away from the housing. Manufacturing the buffer element of rubber or cellulose is particularly recommended for manufacturing technical reasons.

It has also proved to be advantageous for the elastic deformation zone to have at least one flexible tongue, which extends radially around the spherical bearing surface and is in contact with the bearing surface in the upper end of the bearing surface facing away from the pin area of the pivot pin.

Another special design provides for the elastic deformation zone being in contact over its entire surface with the bearing surface in the upper end of the bearing surface facing away from the pin area of the pivot pin and for the deformation zone being made of rubber. Such a design can be manufactured at a low cost especially as a molding.

Corresponding to another preferred embodiment of the present invention, the elastic deformation zone may have a plurality of individual flexible tongues distributed preferably uniformly over the circumference.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENT

Figure 1:
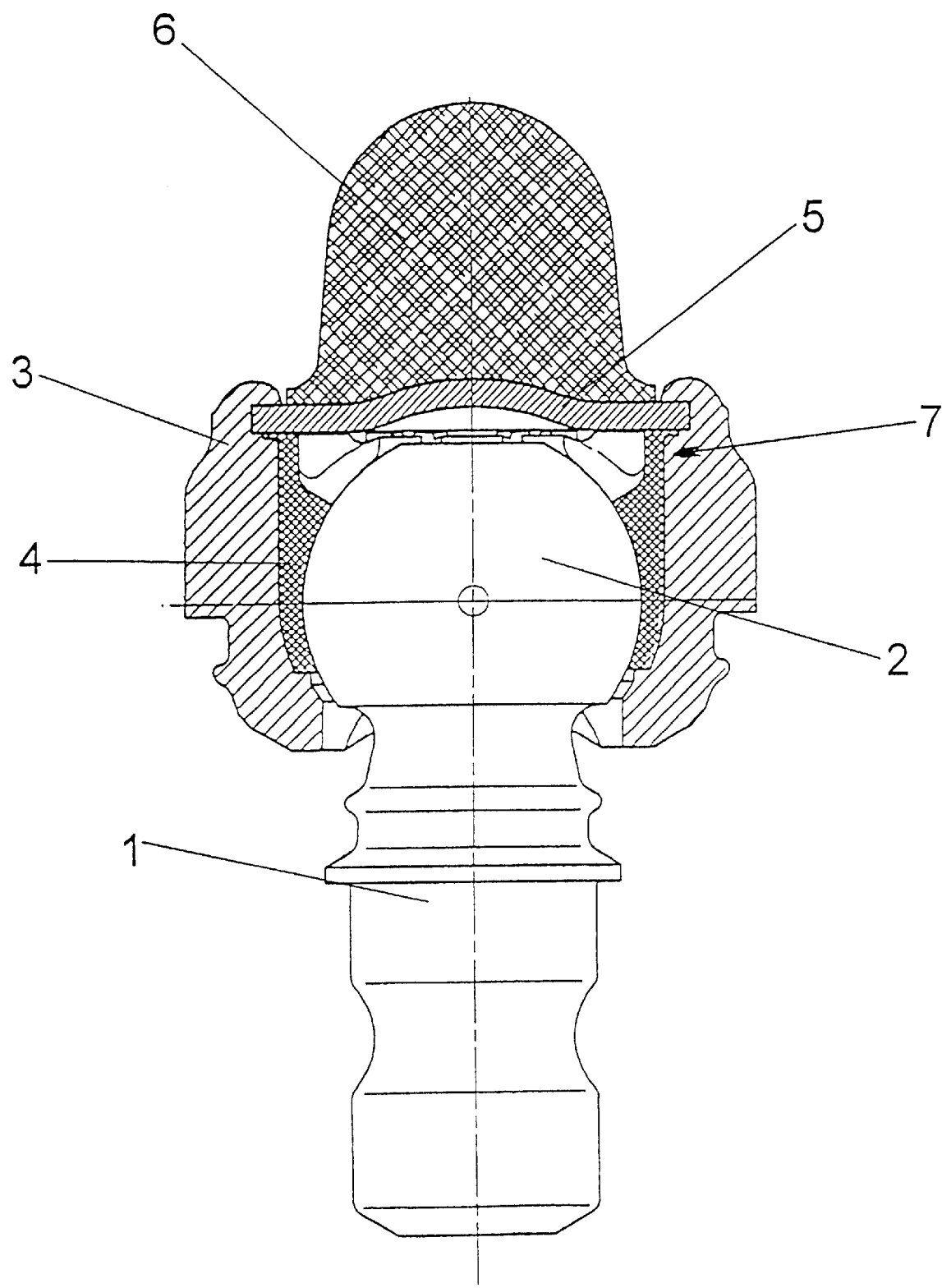
FIG. 1 is a sectional view of a ball-and-socket joint according to the present invention.

Referring to the drawings in particular, the ball-and-socket joint has, in the usual manner, a pivot pin 1 with a spherical joint head 2, which joins it and which is mounted rotatably and deflectably in a recess of the joint housing 3. A bearing shell 4 is inserted between the joint head 2 and the joint housing 3. The bearing shell 4 partially surrounds the joint head 2 on its inside, i.e., it is fitted to the spherical shape of the joint head 2. On the top side of the housing 3 facing away from the pivot pin 1 is located a mounting opening, which is closed by means of a housing cover 5 after the insertion of the pivot pin 1 and of the bearing shell 4. An elastic buffer element 6 is arranged on the outside of the housing cover 5. This buffer element 6 has a hemispherical contour and is preferably made of rubber or cellulose. The housing cover 5 is somewhat arched in the outward direction toward the outside of the housing, as a result of which a storage space for lubricant is obtained within the housing. At the same time, the arch of the housing cover 5 can absorb additional axial stresses, especially pulsed ones, which act on the buffer element from the top.

As is apparent from FIG. 1, the ball-and-socket joint according to the present invention is provided with an additional elastic deformation zone 7. This elastic deformation zone 7 is located in the end area of the bearing shell, facing away from the pin-side end of the pivot pin 1, directly below the housing cover 5.

Figure 2:
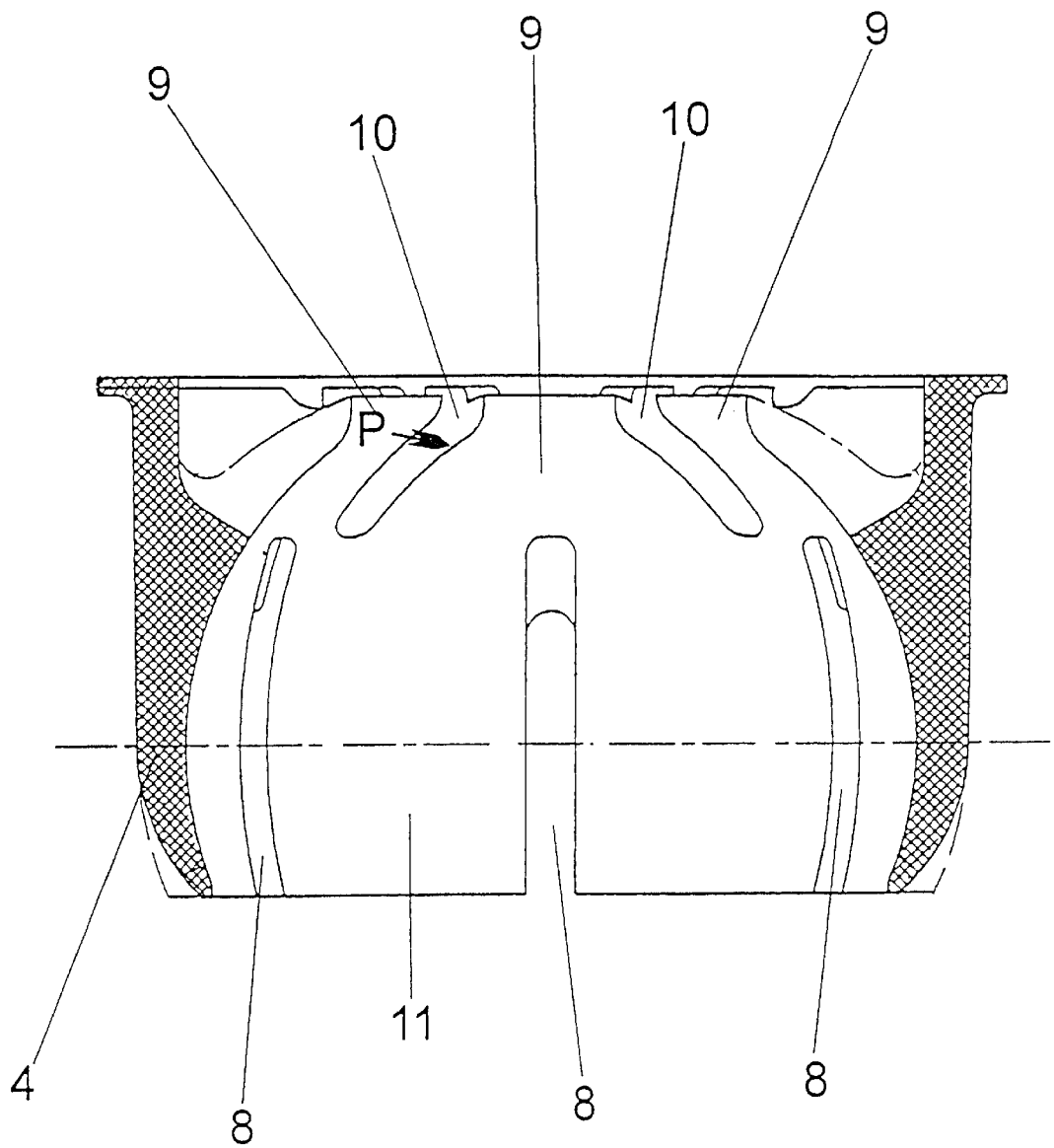
FIG. 2 is an enlarged representation of the bearing shell of the ball-and-socket joint from FIG. 1.

The design of this elastic deformation zone 7 is visible from FIG. 2, in which the bearing shell 4 is shown as an individual part on a larger scale. The bearing shell 4 is preferably made of plastic, e.g., POM (Poly-oxy-methylen), and has a hemispherical bearing surface 11 on its inside. In the area of the contact surface between the bearing shell 4 and the joint head 2, which contact surface is decisive for the absorption of the radial forces occurring, the bearing shell has a plurality of lubricant grooves 8 distributed symmetrically over the circumference. The elastic deformation zone 7, which has a plurality of flexible tongues 9 distributed symmetrically over the circumference of the bearing shell in the exemplary embodiment shown, is located above the area intended for absorbing the radial forces. Narrow spacing grooves 10, which are dimensioned such that an elastic deformation of the flexible tongues 9 can take place in the case of a high pulsed axial stress that cannot be absorbed by the buffer element 6 alone, are located between the individual flexible tongues 9. The axial forces flow via the buffer element 6 and the housing cover 5 directly into the upper area of the bearing shell 4, where the individual flexible tongues can be displaced in the direction of the arrow P in the case of a high axial stress, which leads to a reduction in the size of the spacing grooves 10, and the combination of the buffer element 6 and the deformation zone 7 guarantees that even high pulsed axial loads can be absorbed without damage to the bearing shell.

It is, of course, conceivable that the individual flexible tongues 9 shown in the exemplary embodiment may also be designed as a circular flexible tongue if the material for the bearing shell 4 is selected correspondingly.

Figure 2A:
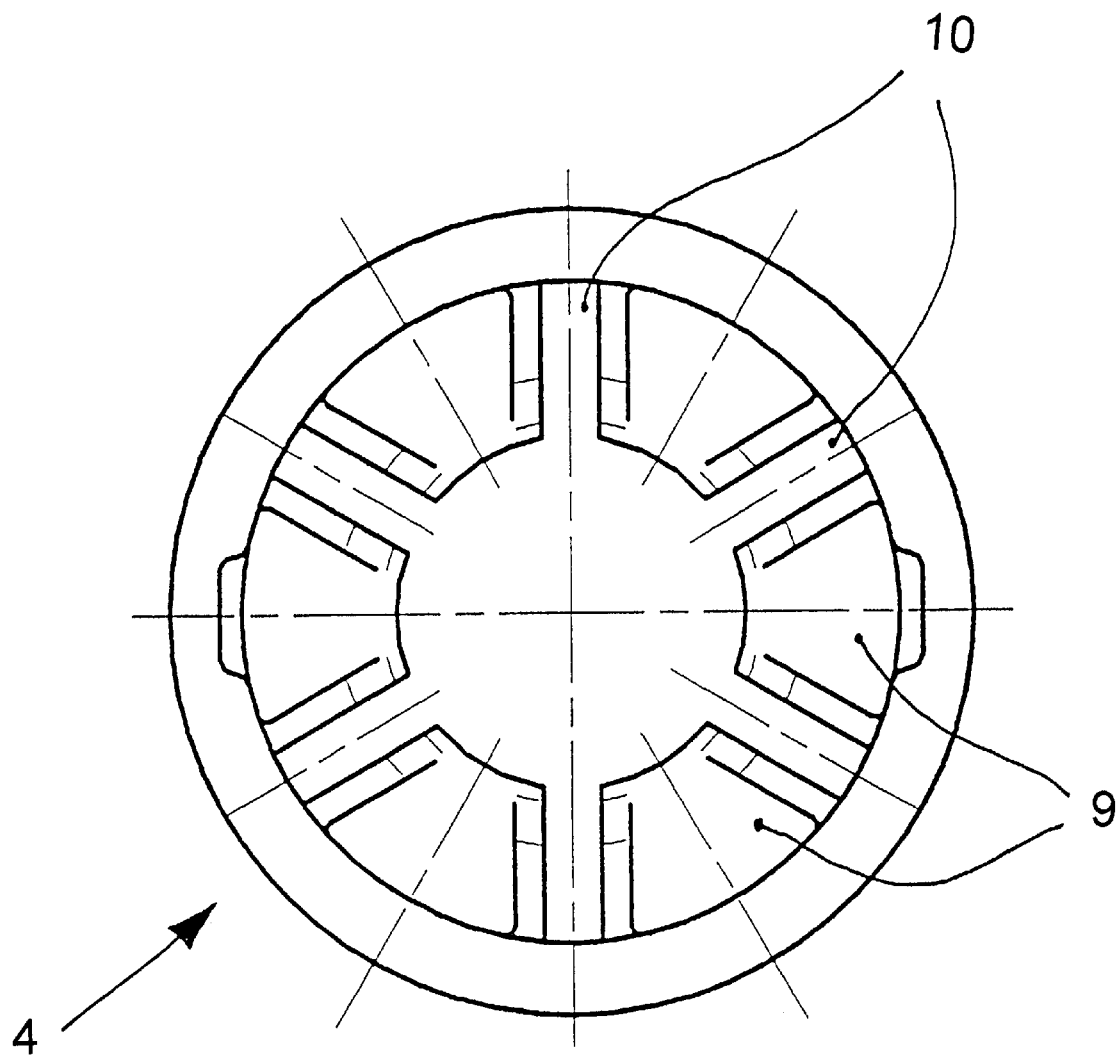
FIG. 2a is a representation of the bearing shell according to FIG. 2, but rotated by 90°.

FIG. 2a additionally shows the representation of the bearing shell according to FIG. 2 as an individual part, rotated by 90°. This figure consequently corresponds to a bearing shell as viewed from the cover side of the ball-and-socket joint.

Figure 3:
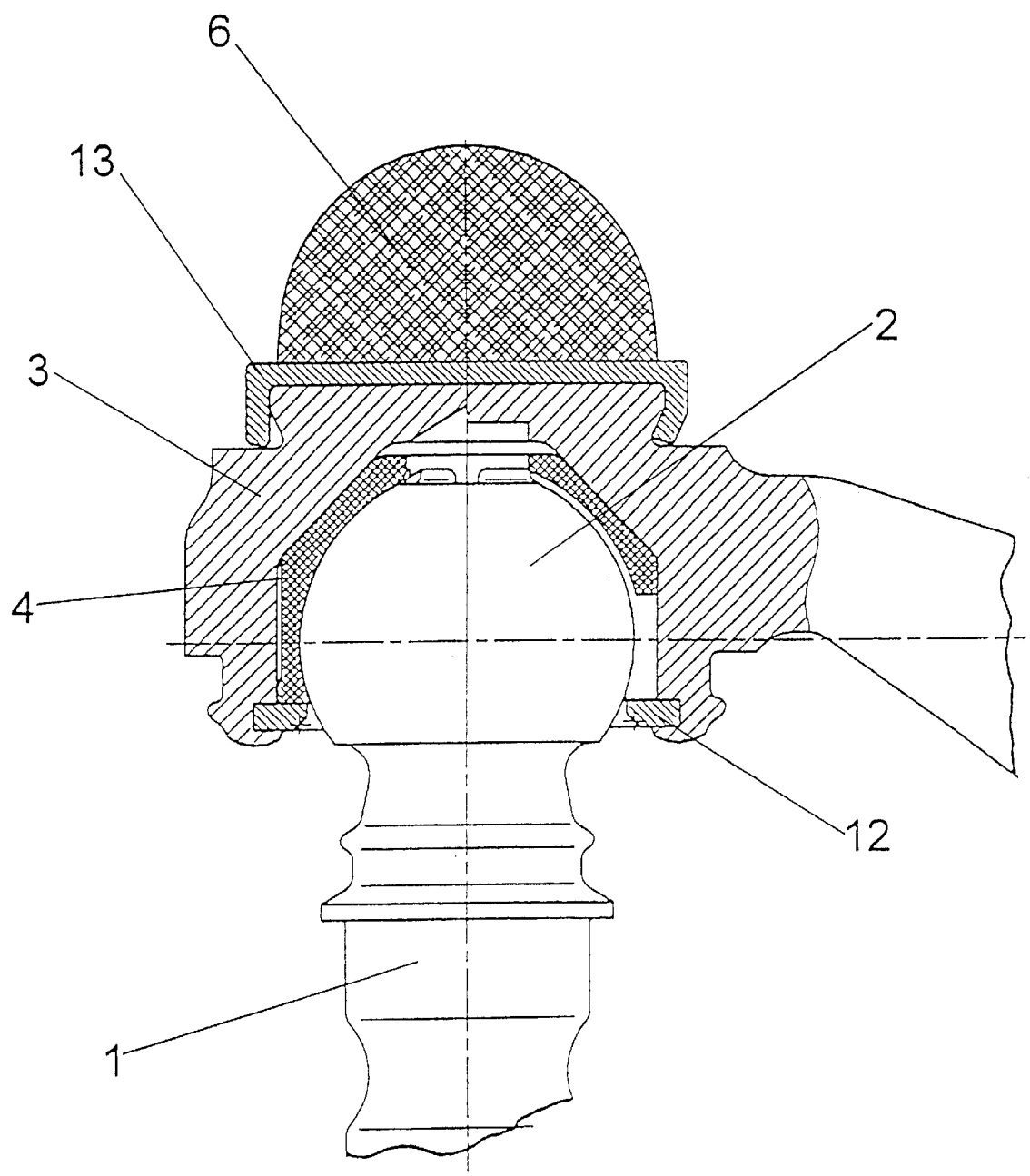
FIG. 3 is a sectional view of another design variant of the ball-and-socket joint according to the present invention.
Figure 4:
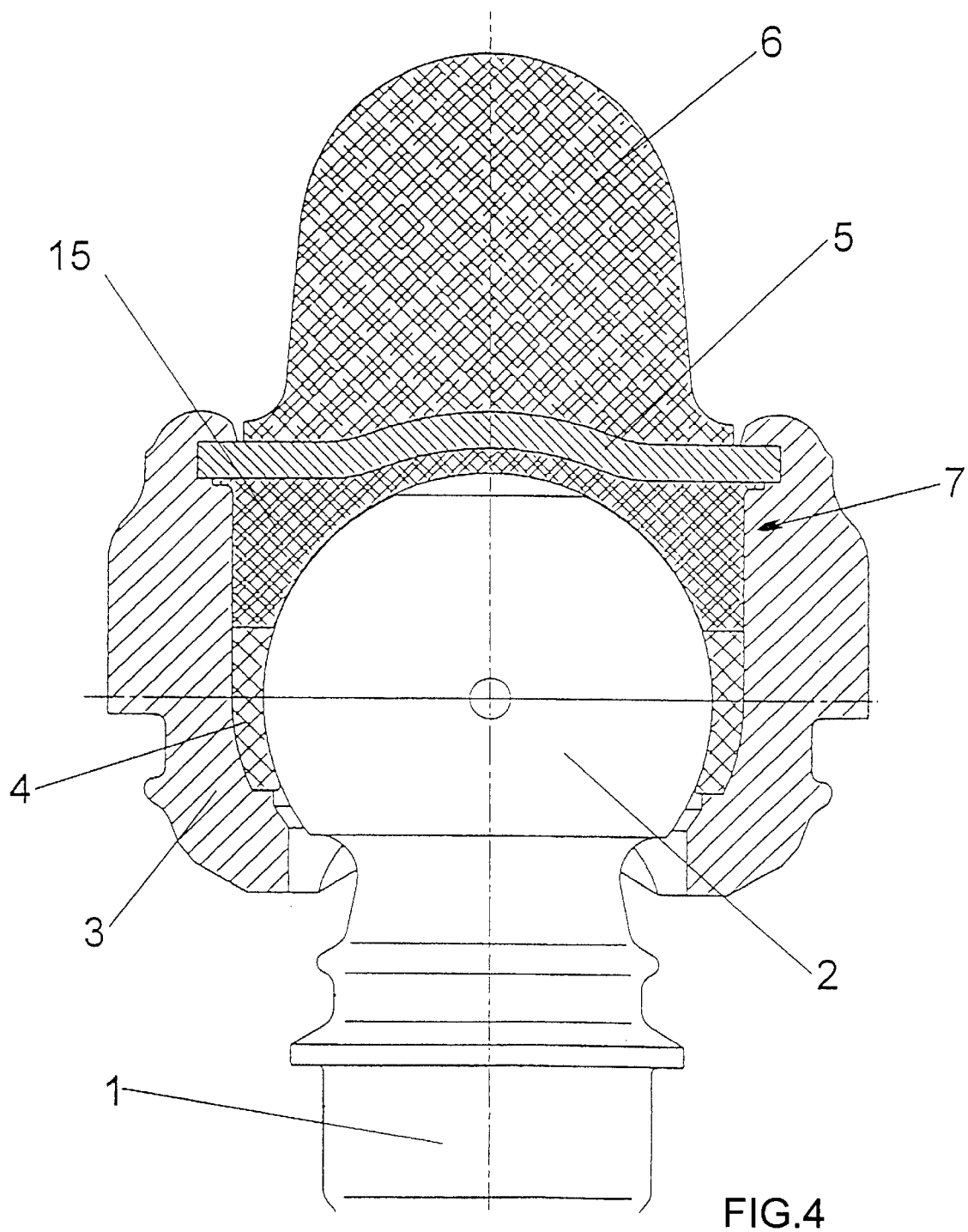
FIG. 4 is a sectional view of a third design variant of the ball-and-socket joint according to the present invention.

FIG. 3 shows a design variant of the ball-and-socket joint according to the present invention, in which the joint housing 3 is designed as a pot-like housing closed on one side. Contrary to the exemplary embodiment according to FIG. 1, the balland-socket joint is fitted here together from the side of the joint housing facing the pivot pin 1. Analogously to the representation in FIG. 1, a bearing shell 4 is located between the joint head 2 and the joint housing 3. After the introduction of the bearing shell 4 and of the pivot pin 1 into the opening provided in the joint housing 3, the joint head 2 is fixed in the housing 3 by means of a closing ring 12. The bearing shell 4 has no elastic deformation zone of its own in this exemplary embodiment. The pulsed axial forces occurring in the longitudinal axis of the pivot pin are absorbed by the buffer element 6 alone, which is located on the upper side facing away from the pivot pin 1. The buffer element 6 has, similarly to the representation in FIG. 1, a hemispherical outer contour and is made of rubber or cellulose. The connection between the buffer element 6 and the joint housing 3 is brought about by an intermediate element 13, which is connected to the buffer element 6 by a vulcanization process and which is in turn fixed to the housing 3 by a beading process. The axial forces to be absorbed flow directly via the buffer element 6 and the intermediate element 13 into the housing 3. A design as shown in FIG. 3 has the advantage that machining of the housing is necessary from one side only. At the same time, the sealing of the interior space of the joint housing 3 by the closing ring 12 is decoupled from the absorption of pulsed forces that occur. FIG. 4 shows an embodiment of the ball-and-socket joint according to the present invention, which corresponds in essential points to that of the exemplary embodiment according to FIG. 1. Analogously to the first exemplary embodiment, the buffer element 6 is located on the outside of the housing cover 5. The elastic deformation zone inside the joint housing 3 consists, contrary to the exemplary embodiment according to FIG. 1, of a molded rubber part 15. The molded rubber part is fitted on its inside to the outer contour of the joint head 2. The molded rubber part 15 is joined on its lower side facing the pivot pin 1 by the bearing shell 4 proper, which is made of a harder material than the shaped rubber part 15 and is used to absorb the radial forces that occur.

While specific embodiments of the invention have been shown and described in detail to illustrate the application of the principles of the invention, it will be understood that the invention may be embodied otherwise without departing from such principles.

APPENDIX

List of Reference Numbers:

1 Pivot pin
 2 Joint head
 3 Joint housing
 4 Bearing shell
 5 Housing cover
 6 Buffer element
 7 Deformation zone
 8 Lubricant groove
 9 Flexible tongue
 10 Spacing groove
 11 Bearing surface
 12 Closing ring
 13 Intermediate element
 15 Molded rubber parts

What is claimed is:

1. A motor vehicle ball-and-socket joint for vehicle suspensions or steering mechanisms, comprising:

a joint housing;

a housing cover closing the joint housing on one side;

at least one bearing shell stationarily fixed in said joint housing;

a pivot pin mounted rotatably in said at least one bearing shell by means of a spherical bearing surface; and an elastic buffer element arranged on the outside joint housing facing away from said pivot pin.

2. The ball-and-socket joint in accordance with claim 1 further comprising an elastic deformation zone arranged at said bearing surface of said pivot pin.

3. The ball-and-socket joint in accordance with claim 1, wherein said buffer element has an essentially hemispherical outer contour with a free end facing away from said joint housing.

4. The ball-and-socket joint in accordance with claim 3, wherein said buffer element is made of one of celluslose and rubber.

5. A motor vehicle ball-and-socket joint for vehicle suspensions or steering mechanisms, comprising:
   a joint housing;
   a housing cover closing the joint housing on one side;
   at least one bearing shell stationarily fixed in said joint housing;
   a pivot pin mounted rotatably and deflectably in said at least one bearing shell by means of a spherical bearing surface in contact at radial side portions with said bearing shell; and
   an elastic deformation zone arranged at said bearing shell in contact with an end area of a bearing surface of said pivot pin;
   an elastic buffer element arranged on the outside of said joint housing, facing away from said pivot pin.

6. The ball-and-socket joint in accordance with claim 5 wherein said elastic deformation zone is in contact over its entire surface with said bearing surface, in an upper end of said bearing surface facing away from a pin are of said pivot pin.

7. The ball-and-socket joint in accordance with claim 5, wherein said elastic deformation zone has at least one flexible tongue in contact with said bearing surface, in an upper end of said bearing surface facing away from a pin area of said pivot pin.

8. The ball-and-socket joint in accordance with claim 5, wherein said deformation zone has a plurality of individual flexible tongues distributed substantially uniformly over the circumference.

9. A motor vehicle ball-and-socket joint, comprising:
   a joint housing defining an opening, said joint housing having an axial extent;
   a housing cover extending across said opening of said joint housing;
   at least one bearing shell in said joint housing;
   a pivot pin mounted rotatably and deflectably in said at least one bearing shell by means of a spherical bearing surface;
   an elastic buffer element arranged on one of an outside of said cover and an outside of said joint housing facing away from said pivot pin on said one side and said elastic buffer element, said elastic buffer extending away form said one of an outside of said cover and an outside of said joint housing, in an axial direction, beyond said axial extent of said joint housing, said elastic buffer element elastically deforming upon the application of external axial loads and transferring external axial loads to one of said joint housing and said cover; and
   an elastic deformation zone arranged in an end area of said bearing surface of said pivot pin and elastically deforming upon application of axially directed forces between said spherical bearing surface and said elastic deformation zone includes one of elastically deformable portions formed intergrally with said bearing shell and an elastic element in direct contact with said bearing shell.

10. The ball-and-socket joint in accordance with claim 9, wherein said buffer element has an essentially hemispherical outer contour with a free end facing away from said joint housing.

11. The ball-and-socket joint in accordance with claim 10, wherein said buffer element is made of one of cellulose and rubber.

12. The ball-and-socket joint in accordance with claim 9, wherein said elastic deformation zone is in contact over its entire surface with said bearing surface, in an upper end of said bearing surface facing away from a pin area of said pivot pin.

13. The ball-and-socket joint in accordance with claim 9, wherein said elastic deformation zone has at least one flexible tongue in contact with said bearing surface, in an upper end of said bearing surface facing away from a pin area of said pivot pin.

14. The ball-and-socket joint in accordance with claim 9, wherein said deformation zone has a plurality of individual flexible tongues distributed substantially uniformly over the circumference.

15. The ball-and-socket joint in accordance with claim 9, wherein:
   said housing cover closes said opening in said joining housing.

16. The ball-and-socket joint in accordance with claim 9, wherein:
   said bearing shell is stationarily fixed in said joint housing.

17. The ball-and-socket joint in accordance with claim 9, wherein:
   said deformation zone includes a molded rubber part having a hardness less than a hardness of said bearing shell.

18. The ball-and-socket joint in accordance with claim 1, wherein:
   said elastic buffer is connected to one of said outside of said joint housing and an outside of said cover.

19. The ball-and-socket joint in accordance with claim 1, wherein:
   said elastic buffer element transfers external axial loads to one of said joint housing and said cover.

20. The ball-and-socket joint in accordance with claim 5, wherein:
   said elastic buffer is connected to one of said outside of said joint housing and an outside of said cover.

21. The ball-and-socket joint in accordance with claim 5, wherein:
   said elastic buffer element transfers external axial loads to one of said joint housing and said cover.

22. The motor vehicle ball-and-socket joint for vehicle suspensions or steering mechanisms according to claim 1, wherein said joint housing has an axial extent on said one side and said elastic buffer element extends away from said one side of said housing, in an axial direction, beyond said axial extent of said joint housing.

23. The motor vehicle ball-and-socket joint for vehicle suspensions or steering mechanisms according to claim 5, wherein said elastic deformation zone includes one of elastically deformable portions formed integrally with said bearing shell and an elastic element in direct contact with said bearing shell.

24. A motor vehicle ball-and-socket joint for vehicle suspensions or steering mechanisms, comprising:
   a joint housing;

a housing cover closing the joint housing on one side;

at least one bearing shell stationarily fixed in said joint housing;

a pivot pin mounted rotatably and deflectably in side at least one bearing shell by means of a spherical bearing surface in contact at radial side portions with said bearing shell; and an elastic deformation zone arranged at said bearing shell in contact with an end area of a bearing surface of said pivot pin, said elastic deformation zone includes a molded rubber part having a hardness less than a hardness of said bearing shell and positioned adjacent to said bearing shell.

* * * * *